US008640063B1

(12) United States Patent
El-Maleh et al.

(10) Patent No.: US 8,640,063 B1
(45) Date of Patent: Jan. 28, 2014

(54) METHOD FOR SYNTHESIZING SOFT ERROR TOLERANT COMBINATIONAL CIRCUITS

(71) Applicant: King Fahd University of Petroleum and Minerals, Dhahran (SA)

(72) Inventors: Aiman Helmi El-Maleh, Dhahran (SA); Khaled Abdel-Karim Daud, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/732,241

(22) Filed: Dec. 31, 2012

(51) Int. Cl.
*G06F 17/50* (2006.01)
(52) U.S. Cl.
USPC .......................................................... 716/104
(58) Field of Classification Search
USPC .......................................................... 716/104
See application file for complete search history.

(56) References Cited

U.S. PATENT DOCUMENTS

| | | | | |
|---|---|---|---|---|
| 6,886,124 B2 * | 4/2005 | Wang | ............................ | 714/738 |
| 6,986,090 B2 * | 1/2006 | Hathaway et al. | ............ | 714/727 |
| 7,181,703 B1 * | 2/2007 | Borer et al. | .................... | 716/104 |
| 7,603,646 B1 * | 10/2009 | Jang et al. | ..................... | 716/138 |
| 7,735,047 B1 * | 6/2010 | Anderson et al. | ............. | 716/116 |
| 7,944,230 B1 * | 5/2011 | Ranganathan et al. | ......... | 326/15 |
| 8,453,082 B2 * | 5/2013 | Keidar-Barner et al. | ..... | 716/106 |
| 2007/0226572 A1 | 9/2007 | Zhang et al. | | |
| 2009/0230988 A1 * | 9/2009 | Nieuwland et al. | ............... | 326/9 |

OTHER PUBLICATIONS

Kai-Chiang Wu and Diana Marculescu "Soft Error Rate Reduction Using Redundancy Addition and Removal" Pub: IEEE Xplore,(2009).

* cited by examiner

*Primary Examiner* — Jack Chiang
*Assistant Examiner* — Brandon Bowers
(74) *Attorney, Agent, or Firm* — Richard C. Litman

(57) ABSTRACT

The method for synthesizing soft error tolerant combinational circuits includes the step of inputting a combinational circuit to a combinational circuit analyzer for analysis. The analyzer then extracts smaller sub-circuits from said combinational circuit, computes probabilities of input vectors to occur for each of the smaller sub-circuits, produces new multi-level sub-circuits from the extracted sub-circuit, and maximizes logical fault masking against the occurrence of a single fault applied to the new multi-level sub-circuits, the maximizing being based on probabilities of sub-circuit input vectors to occur. Finally, the analyzer merges the new multi-level sub-circuits back to the original inputted combinational circuit.

12 Claims, 11 Drawing Sheets

US 8,640,063 B1

METHOD FOR SYNTHESIZING SOFT ERROR TOLERANT COMBINATIONAL CIRCUITS

BACKGROUND OF THE INVENTION

1. Field of the Invention

The present invention relates to combinational circuits, and particularly to a method for synthesizing soft error tolerant combinational circuits.

2. Description of the Related Art

Due to current technology scaling trends, digital designs are becoming more sensitive to radiation-induced particle hits resulting from radioactivity decay and cosmic rays. A low-energy particle can flip the output of a gate, resulting in a soft error if it's propagated to a circuit output.

Reliability with respect to soft errors has become a critical issue in digital circuits. In the past few decades, CMOS technology has reached high scaling advancement. This advancement is consistent with Moore's law, which states that the number of transistors that can be placed in a chip doubles every 18 months. As CMOS technology is improving and reaching the nanometer scale, quantum mechanical effects come into the picture, generating many challenges for additional scaling of CMOS devices. This has motivated researchers to investigate new technologies for circuit design. Circuits and devices based on nanotechnology-based fabrication are expected to offer extra density and performance that takes electronic circuits to the next higher integration level.

Nanoelectronics can operate at very high frequencies (of the order of THz) and achieve very high densities (1012 devices per $cm^2$). Several researchers have presented novel successful nanoelectronic devices. These devices include carbon nano-tubes (CNT), silicon nano-wires (NW), and quantum dot cells. Nanoscale devices are limited by several characteristics. The most dominant characteristics are the devices' higher defect rates and increased susceptibility to soft errors. These limiting characteristics are due to the inherent randomness and imprecision in the bottom-up manufacturing process, which results in a large number of defective devices during the fabrication process. Moreover, the reduced noise tolerance of these devices is responsible for inducing device malfunctions by external influences, such as EMI (electromagnetic interference), thermal perturbations, and cosmic radiation.

In general, errors can be categorized as either permanent or transient errors. Permanent (hard) errors may occur during the manufacturing process or during the lifetime of a device. Transient (soft) errors can arise due to multiple sources, such as high-energy particles, coupling, power supply noise, leakage, and temporal circuit variations. The transient error can last for one or many clock cycles. Both types of errors affect the circuit reliability, if they aren't tolerated. Reliability of a circuit can be defined as the ability to function properly despite the existence of such errors. It is desired to improve tolerance against permanent and transient errors in order to enhance circuit reliability.

Thus, a method for synthesizing soft error tolerant combinational circuits solving the aforementioned problems is desired.

SUMMARY OF THE INVENTION

The method for synthesizing soft error tolerant combinational circuits includes the step of inputting a combinational circuit to a combinational circuit analyzer for analysis. The analyzer then extracts smaller sub-circuits from the combinational circuit, computes probabilities of input vectors to occur for each of the smaller sub-circuits, produces new multi-level sub-circuits from the extracted sub-circuit, and maximizes logical fault masking against the occurrence of a single fault applied to the new multi-level sub-circuits, the maximizing being based on probabilities of sub-circuit input vectors to occur. Finally, the analyzer merges the new multi-level sub-circuits back to the originally input combinational circuit.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
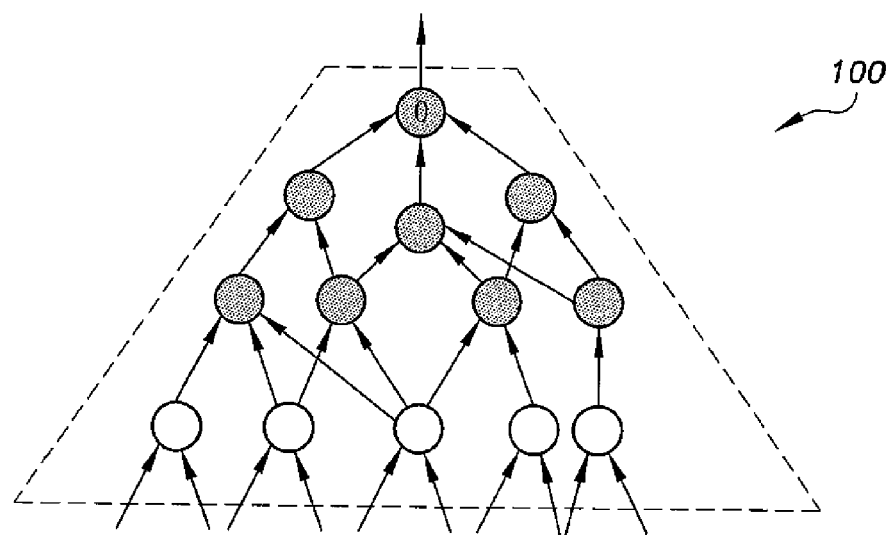
FIG. 1 is an example of a 1-level window.

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

The method for synthesizing soft error tolerant combinational circuits includes the step of inputting a combinational circuit to a combinational circuit analyzer for analysis The analyzer then extracts smaller sub-circuits from the combinational circuit, computes probabilities of input vectors to occur for each of the smaller sub-circuits, produces new multi-level sub-circuits from the extracted sub-circuit, and maximizes logical fault masking against the occurrence of a single fault applied to the new multi-level sub-circuits, the mask maximizing being based on probabilities of sub-circuit input vectors to occur. Finally, the analyzer merges the new multi-level sub-circuits back to the originally input combinational circuit.

A two-level synthesis scheme is presented to maximize soft error masking. This scheme provides a heuristic that first finds the best irredundant set of cubes to cover extracted sub-circuit minterms (the term "minterm" is defined below). This set of cubes is constructed such that fault masking for a single fault is maximized, especially for minterms with a high probability of occurrence. Then, an extra number of cubes can be added as redundant cubes to the cover such that they have significant improvement on maximizing error masking. For each extracted sub-circuit, either the on-phase or the off-phase is synthesized and used to implement the circuit. The phase that has minterms with higher probability of occurrence is implemented.

Regarding the extraction of sub-circuits, the proposed method involves synthesizing small extracted sub-circuits from the original circuit, and by enhancing the reliability of such extracted sub-circuits, the overall reliability of the original circuit will be enhanced as well.

The input of this phase is a multi-level circuit, and the output will be a set of smaller sub-circuits, such that each extracted sub-circuit has a single output, and a maximum number of inputs M. The value of M should not exceed 15 in order to synthesize the sub-circuit in a feasible time. As the extracted sub-circuits will be synthesized individually, each extracted sub-circuit should have one output, maximum M inputs, and it should have no fan-outs to other circuits, since the structure of the sub-circuit will be changed after synthesis.

Extraction of sub-circuits is done as follows. Starting from primary outputs of the original circuit, keep adding gates into sub-circuits level by level until reaching the maximum number of inputs for a sub-circuit M, and without adding fan-out gates. Each extracted sub-circuit is then converted into a two-level circuit in the PLA (programmable logic array) format using the SIS tool. The algorithm of extracting sub-circuits is shown in Table 1.

TABLE 1

Extracting Sub-Circuits Algorithm inputs: original circuit, maximum number of inputs M.
1. Initialize E as the collection of extracted sub-circuits.
2. Add all primary outputs of the original circuit into List1.
3. while ( List1 is not empty ) {
   3.1 O = get the next element in List1.
   3.2 Initialize e as the structure of the new extracted sub-circuit.

TABLE 1-continued

Extracting Sub-Circuits Algorithm 3.3 Starting from O, go back in reverse order in the original circuit, and add gates to e under the following conditions:
     - Prune branching when reaching a fan-out gate or primary input.
     - Terminate adding gates to e when reaching M.
   3.4 Add extracted sub-circuit e to E.
   3.5 For every input i of e sub-circuit:
     - if (i isn't included in List1 AND i isn't a primary input )
       Add i to the end of List1. // i will be the output of a new sub-circuit
} // end while
4. Return (E).

With respect to adding controllability "don't care" conditions to increase flexibility, and to optimize area as well, controllability "don't care" conditions (CDCs) for each sub-circuit can be used. CDCs are defined as the input patterns that are impossible to occur at the inputs of a circuit. A windowing method with simulation is developed. To find CDCs, a window is constructed for each extracted sub-circuit. It contains the sub-circuit gates, in addition to L levels of gates. The additional gates are added by doing back-traversal, starting from the inputs of the sub-circuits. FIG. 1 shows an example of 1-level window 100. The shaded nodes of 1-level window 100 represent the extracted sub-circuit, and the un-shaded nodes represent the additional nodes included in the window for one level.

CDCs conditions are found using simulation as follows. For each sub-circuit, a window circuit is extracted from the original circuit. Then, all possible input patterns of the window circuit are simulated using a developed simulator. For each input pattern, the observed input vector on the inputs of the sub-circuit is added to the "care" set for this sub-circuit. The "don't care" set can then be easily found by removing "care" set vectors from all possible input vectors for the sub-circuit. If the number of primary inputs of the original circuits is small, i.e., less than 25, the window can be constructed starting from the output of the sub-circuit, and then back-traversing until reaching the primary inputs of the original circuit. In such case, we can apply all possible input combinations on the inputs of the window, and we can get all possible CDCs of the sub-circuit of interest. However, if the number of primary inputs is large, we can construct a window by adding levels so that we have a feasible number of inputs.

A key observation about CDCs in this case is that they are compatible, i.e., they can be derived for each sub-circuit and used independently. Optimizing a sub-circuit using the derived CDCs won't have any effect on other extracted sub-circuits. After finding CDCs for each extracted circuit, they can be added to the PLA file of the sub-circuit.

In order to reduce the soft error effect, the proposed design level approach protects the highly probable input patterns by selecting the best fault masking cover and then adding extra redundant cubes. By keeping other input patterns with low probability without adding redundancy, the area overhead is kept minimal.

An assignment of n Boolean variables is called a minterm. The positive and negative minterms correspond to the assignments for which a function takes a value of 1 and 0, respectively. The union of positive and negative minterms is called the care minterms. The proposed method is based on probabilities of the care minterms. Thus, a procedure to find the probabilities is developed.

The set of care minterms for each extracted sub-circuit is already found in the stage of finding CDCs; i.e., all possible input patterns for a sub-circuit except the CDCs. The probability of each care minterm to occur for each extracted sub-circuit is calculated using simulation. A set of all care minterm combinations for all extracted sub-circuits is constructed, and then a set of random input patterns are applied on the primary inputs of the original circuit. For each care minterm, the probability for this minterm to occur is calculated. This is done by dividing the number of times a minterm occurs in simulations by the number of used input patterns. The input patterns can be all possible combinations if the number of primary inputs of the original circuit is feasible. Otherwise, a number of random simulations are used.

A two-level fail rate estimator is a useful tool that estimates the failure rate of a two-level circuit for a single fault based on the fault model. This tool goes over all minterms; on and off minterms, and calculates the number of faulty wires for each minterm. The algorithm for estimating the failure rate of a two-level circuit is shown in Table 2.

TABLE 2

Two-Level Failure Rate Estimator Algorithm inputs: cover S, on-set and off-set minterms with their probabilities.
1. TotalFailureRate = 0.
2. For every m in the on-set minterms:
   2.1 // Find $F_m$; the number of faulty wires.
     2.1.1 $F_m$ = 1. // Due to the output wire of circuit.
     2.1.2 C = set of cubes ∈ S that cover the on-minterm m.
     2.1.3 if (|C| = 1){
        - $I_C$ = number of cube inputs.
        - $N_C$ = number of inverted cube inputs.
        - $F_m = F_m + 2 * N_C + I_C - N_C$. // Faults due to inputs of cube.
        - For every fan-out wire that feeds the cube, add 1 to $F_m$
        if it's faulty.
        // A fan-out wire is faulty if its error doesn't change another
        cube value to 1.
     }
     else { // the cover S has multiple cubes.
        - V = common inputs between cubes in C
        - For every input i in V:
          if ( i is inverted) $F_m = F_m + 2$
          if ( i is faulty fan-out) $F_m = F_m + 1$
     }
   2.2 $P_m$ = probability of m to occur
   2.3. TotalFailRate = TotalFailRate + $F_m * P_m$
3. For every m in the off-set minterms:
   3.1. // Find $F_m$; the number of faulty wires.
     3.1.1. $F_m$ = |S| + 1. // Due to the inputs and output of the OR gate
     3.1.2. FanOuts = { } . // processed fanouts
     3.1.3. For every cube $c_i$ in the cover S:
        Z = number of zero inputs of $c_i$ after applying minterm m
        if (Z = 1){
          l = the zero input in cube $c_i$
          if ( l is not fan-out)
            { if ( l is inverted) $F_m = F_m + 2$. else $F_m = F_m + 1$. }
          else{ // l is fan-out
            $F_m = F_m + 1$. // Due to zero input l
            if ( l is not inverted )
              { if (l ∈ FanOuts) $F_m = F_m + 1$, add l to FanOuts. }
            else{ // l is inverted
              if ( l is fanning out from primary input only) k = 1
              else if ( l is fanning out from inverter output only) k = 2
              else if ( l is fanning out from primary input and
              inverter) k = 3
              if ( k = 1 )$F_m = F_m + 1$. // Due to inverter input
              if (l ∈FanOuts) {$F_m = F_m + k$. , add l to FanOuts. }
            }
          }
        }
   3.2 $P_m$ = probability of m to occur
   3.3. TotalFailRate = TotalFailRate + $F_m$ * Pm
4. Return (TotalFailureRate)

A faulty wire is a wire such that if its value changes due to an error, its faulty value will not be masked. The way to find the number of faulty wires for on-minterms is different than that for off-minterms, as will be explained below. The estimated failure rate for a two-level circuit for a single fault can be estimated according to the following equation:

$$\text{Estimated Failure Rate} = \frac{\sum_{m \in On}(p_m * f_m) + \sum_{m \in Off}(p_m * f_m)}{\text{Total Wires} * 2} \quad (1)$$

where $p_m$ is the probability of a minterm m and $f_m$ is the number of faulty wires for minterm m. The division over 2 is due to the number of stuck-at faults that may occur on a wire.

Figure 2:
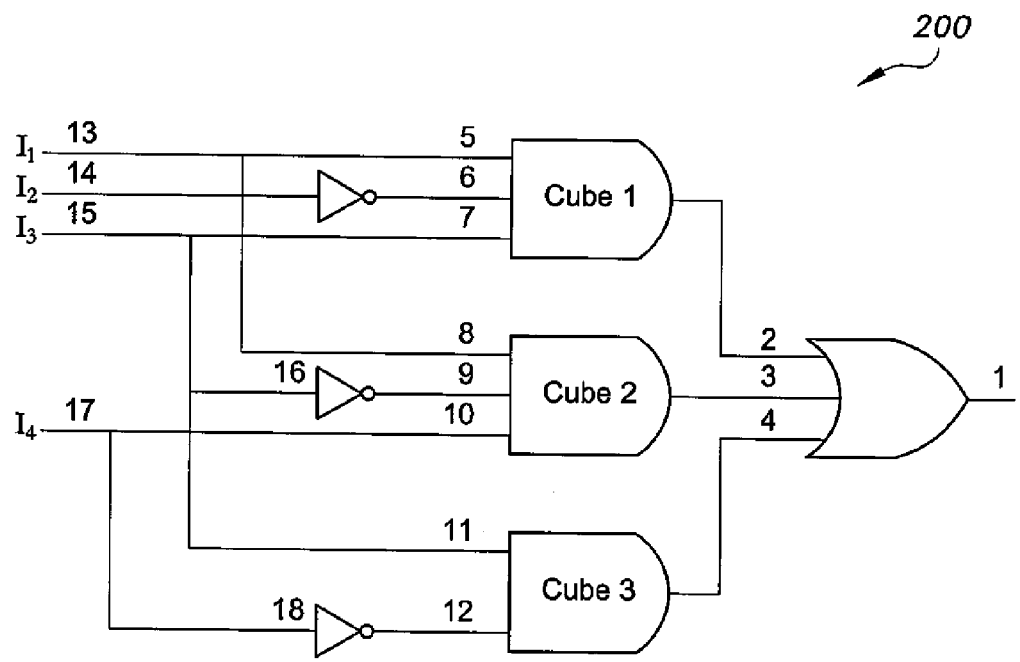
FIG. 2 is a schematic diagram depicting an exemplary failure rate estimator.

Consider a circuit with the following cover: (101-, 1-01, and --10). The implementation of this cover is shown in FIG. 2, illustrating failure rate estimator 200. Suppose the on-minterms are (0010, 1011, and 1010) and off-minterms are (1111, and 0100). The 0010 minterm is covered by only one cube (--10). The faulty wires, considering their numbering in FIG. 2, are as follows. Wire 4 is faulty, since the minterm is covered by only one cube (cube 3). That is, if an error hits, it will not be masked by any other inputs of the OR gate, since all other inputs will be zero. All input wires to cube 3 are faulty, namely, wires 11, 12 and 18, since an error in any of these wires will change the value of the AND gate and make it zero. Since no other cube covers this minterm, the zero value of AND will not be masked, and it will propagate to the output, causing a false output. The fan-out wires 15 and 17 are also faulty because an error in any of them will fail an input value for the cube. The output of the OR gate (wire 1) is always faulty, since there is no masking for it. Hence, the total number of faulty wires for 0010 minterm is 7.

The 1011 minterm is also covered by one cube only (101-). The wires 1, 2, 5, 6, 7 and 14 are faulty wires as explained before. The fan-out wire 13 is also faulty. If we consider the fan-out wire 15; the correct value on it is 1. If an error hits and changed its value to 0, then the value of cube 1 will be zero. However, the second input of cube 2 will be one, and so, all inputs of cube 2 are ones. Therefore, the fault in wire 15 is masked because the change in its value makes another cube (cube 2) to be 1. The total number of faulty wires for 1011 minterm is 7.

The 1010 minterm is covered by two cubes, namely, the 101- and --10 cubes. In this case, none of the OR gate inputs will be faulty; since an error in any of those cubes output will be masked by the other one. Also, none of the two cubes inputs are faulty. However, there are faulty wires due to fan-outs. The fan-out wire 15 is faulty in this case, since an error will cause both values of cubes to be zero. The total number of faulty wires for 1010 minterm is 2.

The way to find the faulty wires for off-minterms is different. For off-minterms, the output should be zero, and no covering is considered in this case. If an error hits in any of the OR inputs, it causes one of the inputs to be logically one, and it can't be masked. However, fault masking can be considered at the inputs of each AND gate. If an input of the AND gate is zero, then an error in any of the other inputs will be masked, since the value of AND gate will be zero.

Considering the off-minterm 1111, the output and input wires of the OR gate are always faulty, and so the wires 1, 2, 3 and 4 are faulty. Considering cube 1, since the second input is zero, then the other inputs of the AND gate are not faulty. However, the second input wires are faulty, namely, wires 6 and 14. For cube 2, wires 9, 16 and 15 are faulty. In cube 3, wires 12, 18 and 17 are faulty. The total number of faulty wires for 1111 minterm is 12.

For the off-minterm 0100, the wires 1, 2, 3 and 4 are faulty. For cube 1, all of the three inputs are zeros, and hence none of the input wires of this cube is faulty because an error in any input will be masked by the two other zero inputs of the AND gate. In cube 2, two inputs are zeros, the first and the third inputs, and hence none of the input wires of this cube is faulty because an error in any input will be masked by at least one other zero input of the AND gate. For cube 3, only the first input is zero, and so the wires 11 and 15 are faulty. The total number of faulty wires for 0100 minterm is 6. Table 3 shows a summary of minterm faulty wires, along with their probabilities. The estimated failure rate for this circuit can be calculated as follows:

$$f = \frac{(0.1*7 + 0.2*7 + 0.5*2) + (0.07*12 + 0.13*6)}{18*2} = 0.131$$

TABLE 3

Summary of Failure Rate Estimator Example

|  | Minterm | Probability | Number of faulty wires |
|---|---|---|---|
| ON MINTERMS | 0010 | 0.1 | 7 |
|  | 1011 | 0.2 | 7 |
|  | 1010 | 0.5 | 2 |
| OFF MINTERMS | 1111 | 0.07 | 12 |
|  | 0100 | 0.13 | 6 |

In the method for selecting covering cubes for each extracted sub-circuit, the inputs are a PLA file that contains the minterms of a sub-circuit in addition to the CDCs, and a file that contains the probabilities of sub-circuit care minterms. All prime cubes can be found using the ESPRESSO tool. The ESPRESSO tool is a well-known logic minimization tool that includes a computer program using heuristic and specific algorithms for efficiently reducing the complexity of digital electronic gate circuits. The goal is to find a set of cubes, i.e., product terms in the ON-, DC- and OFF-covers, such that the set covers all minterms and gives better reliability with minimal area overhead. Finding an exact solution is computationally complex and infeasible, especially if the number of generated prime implicants is large. However, a heuristic is developed that is a greedy algorithm.

The present method maximizes error masking for minterms with high probability of occurrence. A very important step includes selecting the phase to implement either on or off. The phase with higher probability of occurrence is better to implement. The probability of a phase can be calculated easily by summing the probability of its minterms. Selecting covering cubes is done for the phase of circuit with the higher probability.

Some cubes are mandatory to be selected, which are the essential cubes, so these cubes (if they exist) will be selected first. After that, all other cubes will be assigned a weight; which represents how much a cube is improving error masking. The cube with the highest weight is selected if it covers new minterms. Otherwise, the next highest weight cube will be selected, and so on.

Figure 3:
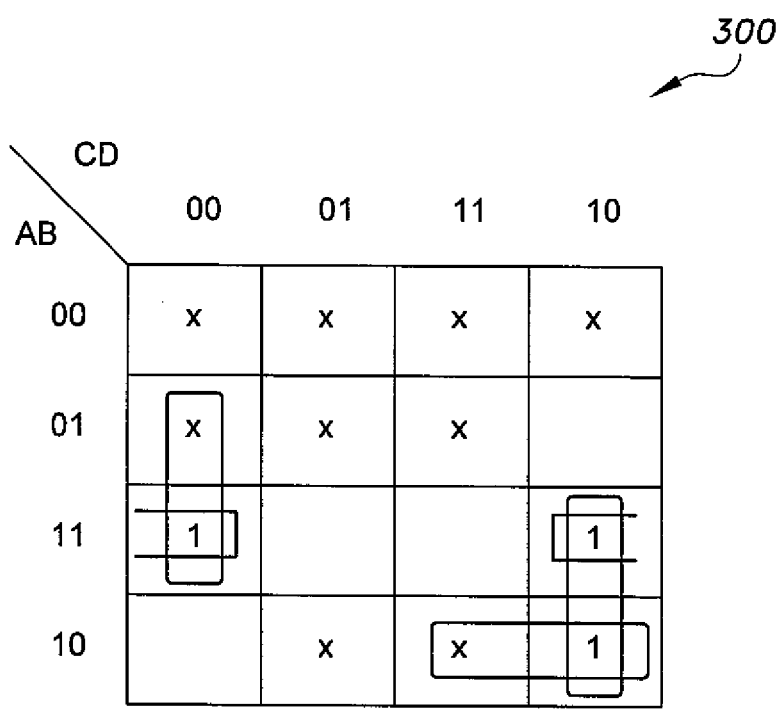
FIG. 3 is a diagram depicting a K-map for the first example.

To illustrate the idea, consider the K-map 300 shown in FIG. 3 for an extracted circuit with four inputs, where 1 represents an on-set minterm and x represents a don't care input. The function of the circuit has four primary implicants, namely, -100, 11-0, 1-10, and 101-. We need at least two cubes (implicants) to cover all on-minterms. The following are some possible covers that can be used: [(-100, 1-10), (11-0, 1-10)]. Table 4 shows the covering for a set of cubes to the on-minterms. The first column contains the on-minterms, the second column contains the probability for each minterm to occur at the inputs of the circuit, and the last three columns show the minterms covered by each cube.

TABLE 4

Selected Cubes Covering For Example 1

| Minterm | Minterm Probability | -100 | 11-0 | 1-10 |
|---|---|---|---|---|
| 1010 | 0.23 |  |  | 1 |
| 1100 | 0.045 | 1 | 1 |  |
| 1110 | 0.68 |  | 1 | 1 |

Although the two covers contain two cubes, there is a difference in reliability. Considering the two cubes, i.e., -100 and 1-10, each minterm is covered by only one cube. And so, for each minterm, if an error hits in the logic of any cube it will not be masked, and it will be propagated to the output. In the second implementation, i.e., 11-0 and 1-10, the minterms 1010 and 1100 are also covered by one cube, but the minterm 1110 is covered by the two cubes. That is, for the 1110 minterm, if an error hits in the logic of one cube, it will be masked by the other cube.

Figure 4A:
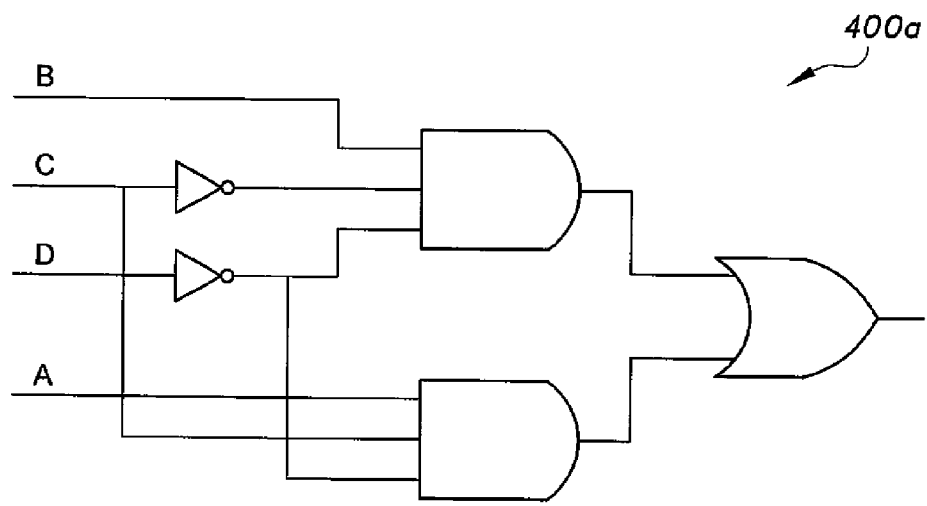
FIG. 4A is a schematic diagram showing a first implementation of a soft error logical masked combinatorial circuit according to the present invention.
Figure 4B:
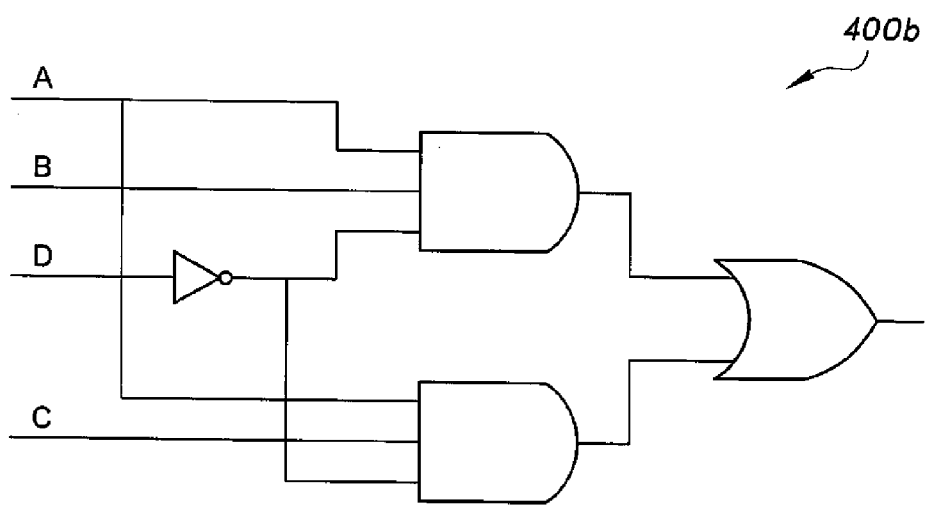
FIG. 4B is a schematic diagram showing a second implementation of a soft error logical masked combinatorial circuit according to the present invention.
Figure 5:
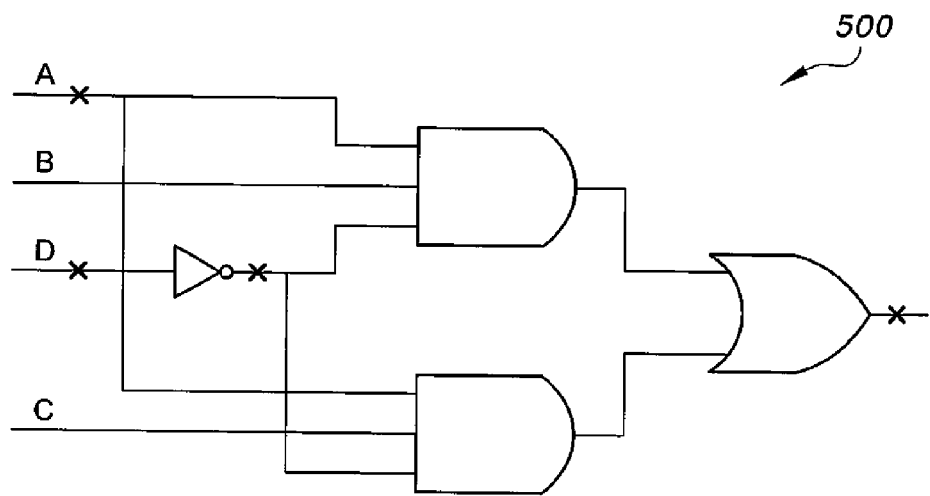
FIG. 5 is a schematic diagram showing faulty wires in example 1.

FIGS. 4A-4B (400a, 400b) show the logical circuit for implementations 1 and 2. In implementation 1, each minterm is covered by only one cube, and so, if an error hits and changes the output of the covering cube, this error will not be masked. The 1010 minterm is only covered by the cube (1-10). The number of faulty wires for this minterm is 8. The 1100 minterm is only covered by the cube (-100) with 8 faulty wires. The 1110 minterm is also covered by one cube (1-10) and has 7 faulty wires. In the second implementation, the number of faulty wires for minterms 1010 and 1100 are 8. Consider the minterm 1110 in implementation 2, since this minterm is covered by the two cubes, if a single error hits in any cube, it will be masked by the other cube, except for fan-outs that are feeding both cubes. The equivalent circuit 500 of FIG. 5 shows the faulty wires for the 1110 minterm in implementation 2. They include 4 wires. One of them is due to an output wire, which can't be masked in all cases. The second is due to fan-out of the first input, and the remaining two are due to fan-out of the fourth input, which is an inverter. The faulty wires for minterm 1110 are reduced from 7 to 4. Considering the large probability of 1110 minterm, this reduction has a high impact on reducing the failure rate of the circuit. To compare between the two different implementations, the failure rate for each one of them can be estimated using equation (1). By ignoring failure rate due to off-set minterms, the failure rate due to on-set minterms for the two implementations can be calculated as follows:

$$\text{Failure Rate 1} = \frac{[(0.23*8 + 0.045*8 + 0.68*7)]}{13*2} = 0.268$$

$$\text{Failure Rate 2} = \frac{[(0.23*8 + 0.045*8 + 0.68*4)]}{12*2} = 0.205$$

According to estimated failure rates, the second implementation reduces the failure rate dramatically. This is due to the extra covering for the minterm 1110, which has a very high probability of occurrence. To find the covering cubes, the essential cubes are found first and added to the cover. An essential cube is defined as a cube that covers at least one minterm that is not covered by any other prime cube. Essential cubes are mandatory, and they are added to the cover first. After that, cubes are added according to their weight. At each time, the weights of the cubes are calculated and the cube with the maximum weight is added to the cover if it covers new uncovered minterms. This process terminates when all minterms are covered. If there are no essential cubes, the cube that covers more minterms (considering their probabilities) is added first. After covering all minterms, the redundant cubes are removed from the cover, since at this stage we want a cover that has no redundant cubes. Redundant cubes can be added in the next stage, as explained below. This is important, since not all redundant cubes have the same effect on error masking.

Since it is desired, by adding a new cube, to decrease the number of faulty wires considering probabilities of minterms, the weights for cubes are calculated as follows. Each non-selected cube will be assigned a weight that represents the enhancement on fault masking, i.e., decreasing of faulty wires. For each minterm, a weight is calculated due to each cube, then for each cube, the weights of all minterms are summed. For a cover S, minterm M, and cube C, $F_{old}$ represents the number of faulty wires in the cover S for M, and $F_{new}$ represents the number of faulty wires in cover S with the new cube C added to the cover. The weight of the minterm M can be calculated as:

$$W_M = \begin{cases} 0.00001 & \text{if } M \text{ is covered by } C \text{ and is not covered by } S \\ \dfrac{F_{old} - F_{new}}{F_{old}} & \text{if } M \text{ is covered by } S \end{cases} \quad (2)$$

All non-selected cubes will be assigned a weight using equation (2). If the minterm M is covered by cube C, and is not covered by any cube in the cover S, a very small value is used for weight. This condition is needed when the function has no essential implicants. In such case, the first cube to be selected will be the cube with the highest probability of occurrence. The value is very small so that it will not affect selecting a cube according to covering, and selection will be based on higher probability of occurrence. However, if the minterm M is covered by at least one cube in the cover S, the weight is assigned the value $(F_{old}-F_{new})/F_{old}$. This value represents the masking improvement that cube C will add regarding minterm M.

Calculating $F_{old}$ and $F_{new}$ is done using the same method used in the two-level estimator when finding the number of faulty wires for on-minterms. According to the value of $W_m$ for each minterm, and by assuming that the probability of a minterm to occur is Mp, the weight of a cube is as follows:

$$\text{Estimated Failure Rate} = \sum_{M \in on-minterms} (W_M * W_p) \quad (3)$$

Figure 6:
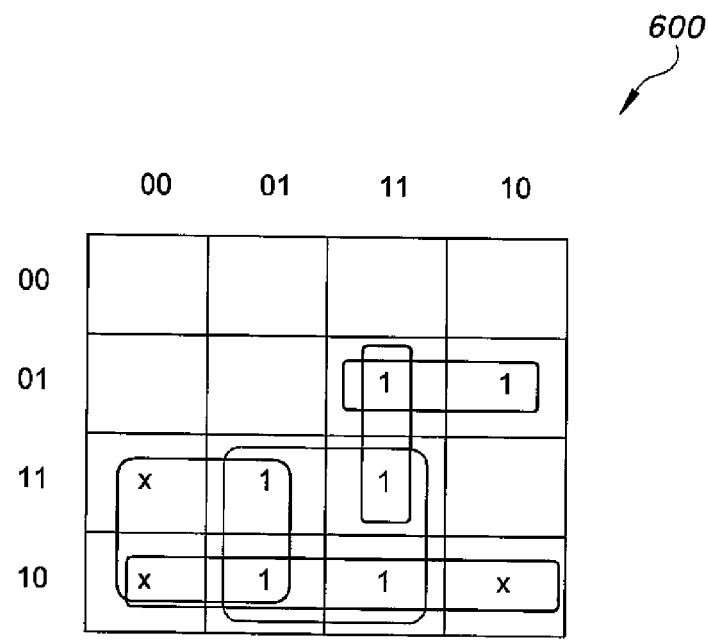
FIG. 6 shows a k-map diagram for example 2.

Referring to FIG. 6, consider the k-map 600 for a circuit. The covering matrix for all prime implicants is built first, as shown in Table 5.

TABLE 5

Cubes Covering For Example 2

| Minterm | Minterm Probability | 011- | -111 | 1-0- | 1--1 | 10-- |
|---------|---------------------|------|------|------|------|------|
| 0111 | 0.1 | 1 | 1 | | | |
| 0110 | 0.1 | 1 | | | | |
| 1101 | 0.4 | | | 1 | 1 | |
| 1111 | 0.2 | | 1 | | 1 | |
| 1001 | 0.1 | | | 1 | 1 | 1 |
| 1011 | 0.01 | | | | 1 | 1 |

Initially, the cover set is empty, i.e., Cover=[ ]. The essential cube (011-) will be added first to the cover, Cover=[011-]. Then, the weight for each of the remaining cubes is calculated. The cube (-111) will have the highest weight, since for now only two minterms are covered (0111 and 0110). The cube (-111) covers one of them, and so it will decrease the number of faulty wires. Hence, Cover=[011-, -111]. The next selected cube is (1--1) and Cover=[011-, -111, 1--1]. At this stage, all minterms are covered. By checking redundancy, it's clear that the cube (-111) is redundant. The final cover will be Cover=[011-, 1--1].

Adding redundant cubes increases fault masking. After finding an irredundant set of cubes that cover all minterms, a set of redundant cubes can be added to the cover to increase fault masking. Adding redundant cubes is also done according to maximum weight. A specified number of redundant cubes can be added to the cover, or a weight threshold can be specified for adding a redundant cube. In the present synthesizing method, a threshold is specified, such that the algorithm keeps adding redundant cubes so long as the added cube satisfies the threshold. The threshold represents the total failure rate improvement for the sub-circuit resulting from adding a redundant cube. The weight for each cube is calculated as explained above.

Suppose that the cube with the maximum weight is $C_{MAX}$, S is the covering set before adding $C_{MAX}$, and S1 is the cover after $C_{MAX}$ is added to the cover, $F_S$ is the estimated failure rate of S, and $F_{S1}$ is the estimated failure rate of $S_1$. Then, the cube is added to the cover as a redundant cube if it satisfies the following: $(F_S-F_{S1}>\text{Thr})$. We have used 0.01 as a suggested value for Thr. The threshold value represents how much a redundant cube will decrease the failure rate of a circuit. $F_S$ and $F_{S1}$ are computed using the two-level single fault failure rate estimator given in Table 2. Following on the previous example, three cubes can be used as redundant cubes (-111, 1-0-, and 10--). If the cube 1-0- is added as a redundant cube, the minterms 1101 and 1001 will be covered by 2 cubes. Those minterms have high probability of 0.5. If the cube -111 is used, minterms of total probability of 0.3 will be covered by 2 cubes. Using the cube 10--, minterms of total probability of 0.11 will be covered by 2 cubes. Hence, the redundant cubes sorted according to their weights are: 1-0-, -111 and 10--. It's worthwhile to mention that cube -111 was selected as the highest weight cube after the essential in the previous phase (finding cover). Now, another cube has the maximum weight. This emphasizes the need of deleting redundant cubes in the previous phase, and then adding extra redundant cubes according to their weight.

Figure 7A:
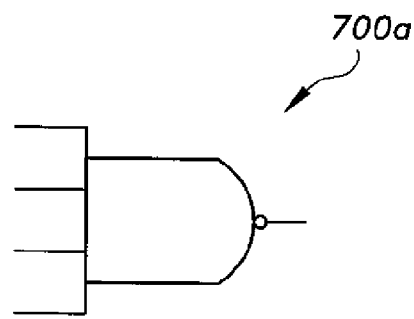
FIG. 7A is a schematic diagram of an exemplary combinatorial circuit.
Figure 7B:
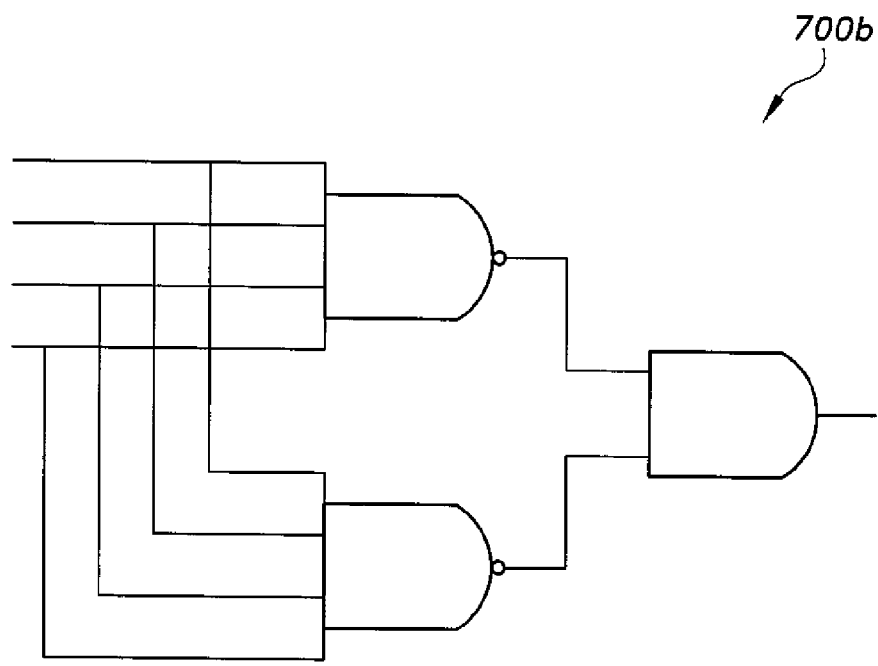
FIG. 7B is a schematic diagram of the one cube off-phase duplication of the exemplary combinatorial circuit of FIG. 7A.
Figure 8A:
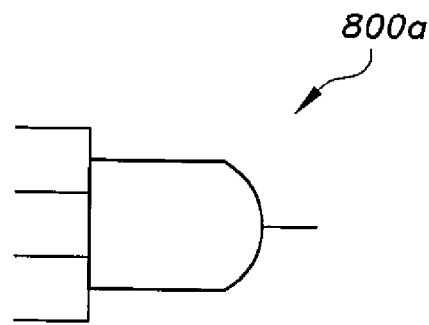
FIG. 8A is a schematic diagram of another exemplary combinatorial circuit.
Figure 8B:
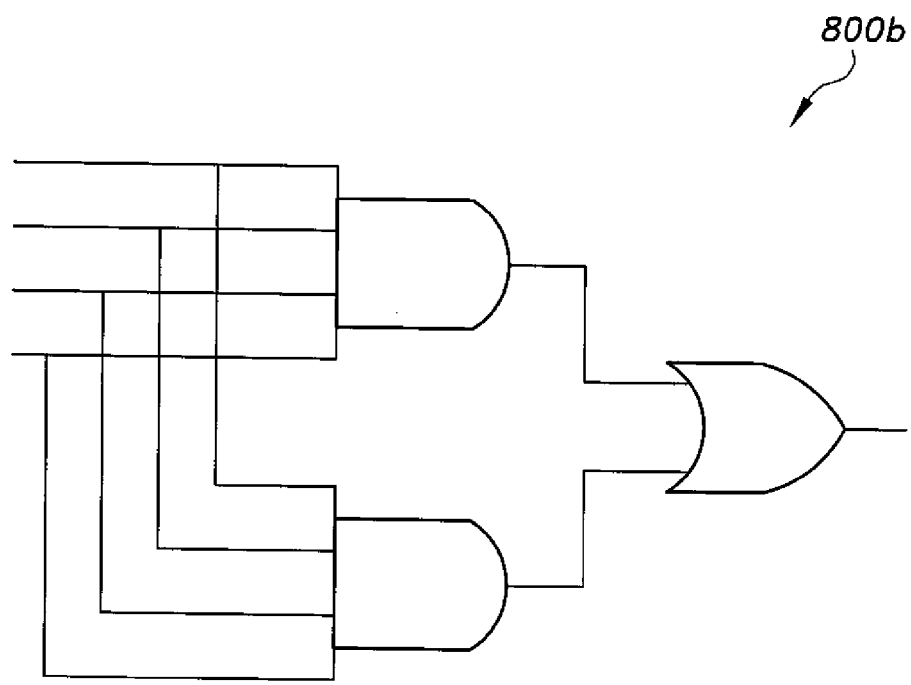
FIG. 8B is a schematic diagram of a one cube on-phase duplication of the exemplary combinatorial circuit of FIG. 8A.

For some extracted sub-circuits, the phase with the higher probability of occurrence produces only one cube. This case happens when a phase produces only one prime implicant. In such case, this cube will not help in reliability. Consider a circuit 700a with a very high off-set probability, with the implementation shown in FIG. 7A. Most of the time the NAND of circuit 700a will produce logic 0. If any error hits at the inputs, there is no way for a fault to be masked, and it will generate a faulty output. To increase the reliability in such case, this single cube can be duplicated. Circuit 700b of FIG. 7B shows the duplication scheme, in which two copies of the cube are used to feed an AND gate. The fault masking in the duplication scheme will be as follows. Consider first the off-set minterms, which have the higher probability. If an error hits at any NAND gate logic, either inputs or output, it will be masked by the other NAND gate, since we have an AND gate at the output. Regarding the opposite phase, on-set phase, masking only occurs at the inputs of NAND gates. However, if the higher probability phase is the on-set, and it produces only one cube, i.e., one AND gate, then the logic is duplicated using an OR gate. FIG. 8A shows circuit 800a, which is an implementation of on-phase with one cube only, and the duplication scheme is shown in circuit 800b of FIG. 8B.

Regarding two level circuit synthesis, each extracted subcircuit will be synthesized using Algorithm 1, which is shown in Table 6. Algorithm 1 represents a two-level synthesis technique that uses a heuristic to increase fault masking for high probability input vectors for an extracted circuit.

In Table 6, inputs are: the minterms of ON and OFF phases with their probabilities, don't care minterms, and the threshold for adding redundant cubes. First, the algorithm will determine the phase to implement. This is done by computing the probability of each phase and selecting the phase with higher probability of occurrence. Next, all prime implicants according to minterms of selected phase are computed using the Espresso tool. The essential primes are computed and added to the cover S.

TABLE 6

Algorithm 1- Two-Level Tool to Enhance Fault Tolerance inputs: on-set and off-set minterms with their probabilities, don't cares, threshold Thr
1. $P_{ON}$ = summation of probabilities of all On-set minterms
   $P_{OFF}$ = summation of probabilities of all Off-set minterms
2. if ($P_{ON}$ > $P_{OFF}$) SM = On-set minterms else SM = Off-set minterms
3. Initialize the cover S = { }.
4. Using SM:
   4.1. Find all prime implicants (cubes) P using Espresso tool.
   4.2. Find all essential cubes (if they exist) and add them to the cover S
5. while (not all minterms in SM are covered by S) {
   Calculate weight for each non-selected prime implicant in P using eqn. 3 using SM minterms
   Select the highest weight cube C that covers new minterms in SM that are not covered by S
   Add cube C to the cover S
   } // end while
6. For every cube $c_i$ in the cover S: // remove redundant cubes
   if (each minterm covered by $c_i$ is covered by at least one other cube in S)
       delete cube $c_i$ from the cover S
7. while (true) { // add redundant cubes
   Calculate weight for each non-selected prime implicant in P using eqn. 3
   R = the prime cube with highest weight
   $F_S$ = estimated failure rate of the cover S using eqn.1
   $F_{S1}$ = estimated failure rate of the cover S + R using eqn.1
       if ( Fs – $F_{S1}$ > Thr) add the R cube to the cover S else Go to step 8
   } // end while
8. Initialize synthesized circuit new
9. if ( |S| = 1) // if the cover S produces only one cube; duplicate
       if ($P_{ON}$ > $P_{OFF}$) new = cube (AND) gate is duplicated using an OR gate
       else new = cube (NAND) gate is duplicated using an AND gate
   else{ // the cover S contains multiple cubes
       if ($P_{ON}$ > $P_{OFF}$) new = implement S cubes as AND gates feeding an OR gate
       else new = implement S cubes as AND gates feeding a NOR gate
   }
10. Return (new)

Then, cubes are added to the cover according to a weight metric. A weight for each cube not included in the cover is calculated, and the cube with the highest weight is selected and added to the cover if it covers newly uncovered minterms. Otherwise, the next highest weighted cube is selected, and so on. This process of adding cubes is terminated when all minterms (of the selected phase) are covered. After that, the redundant cubes are removed from cover. In the next step, a set of cubes are added as redundant cubes to increase fault masking. Redundant cubes are added according to their weights. The adding redundant cubes process is terminated when the decreasing of failure rate for a circuit resulting from a redundant cube is less than the redundancy threshold. Finally, the implementation of the new circuit is formulated according to the type of selected phase. Duplication is applied when the cover produces only one cube.

The complexity of Algorithm 1 is mainly controlled by the number of inputs of an extracted circuit. Complexity can be explored as follows. The number of prime implicants has an upper bound of $O(3^k/k)$, where k is the number of circuit inputs. Computing the weight of a cube needs traversing all minterms. It has a complexity of $O(M)$, where M is the number of minterms, which is $O(2^k)$. The time-consuming step in Algorithm 1 is finding the cover. Covering all minterms step has two nested loops. The outer loop terminates when all minterms are covered. It has a complexity of $O(C)$, where C is the number of covering cubes. The inner loop goes through all generated prime cubes and computes a weight for each cube. It has a complexity of $O(3^k/k*M)$. The complexity of covering all minterms is $O(3^k/k*M*C)$. The complexity of removing redundant cubes is $O(C^2*M)$, where C is the number of covering cubes. The complexity of adding redundant cubes is $(R*3^k/k*M)$, where R is the number of extra redundant cubes. Usually, the number of extra redundant cubes is small (R<<C), the complexity of finding cover is $O(3^k/k*M*C)$. The upper bound of C is $O(3^k/k)$. Therefore, the upper bound of the complexity of Algorithm 1 is $O(3^k/k*2k*3^k/k)=O(18^k/(k^2))$. As the value of k is 15 at maximum, this time complexity is feasible.

The present method introduces a novel technique, presented in Algorithm 1, to increase combinational circuit reliability, and hence fault tolerance. This technique relies on enhancing fault masking for each extracted sub-circuit, and hence the overall fault masking of the original circuit is improved as well. Moreover, the present method introduces a heuristic to find a two-level cover that maximizes fault tolerance, especially for input patters with high probability of occurrence for each extracted sub-circuit.

The selection of phase to implement is very important, since selecting a phase with very low probability to occur will have negligible improvement. Most of extracted sub-circuits were experimentally determined to either have a very high on-phase probability or a very high off-phase probability. In such cases, selecting the phase with the higher probability is effective.

An alternative embodiment of the present method is capable of multi-level logic synthesis for soft error tolerance. A fast extraction algorithm based on the extraction of double-cube divisors along with their complements and single cube divisors with two literals is used. To minimize area, single cube and double cube divisors with highest area weights are selected. In what follows, we will use fast extraction to minimize areas of circuits obtained in the two level logic synthesis, but by avoiding extracting cubes that have a negative impact on reliability.

Fast extraction for area optimization involves extracting two types of cubes: double-cube divisors and single-cube divisors. Double-cube divisors are cube-free multiple cube divisors having exactly two cubes. An exemplary Boolean function written as sum-of-products is:

$$f=ade+ag+bcde+bcg.$$

TABLE 7

Double-Cube Divisors Along With Their Bases for $f$

| Double-cube divisors | Base |
|---|---|
| de + g | a, bc |
| a + bc | g, de |
| ade + bcg | { } |
| ag + bcde | { } |

Table 7 shows all possible double-cube divisors that can be extracted from this function, along with their bases. For instance, if the first double cube is to be extracted, the multi-level network of the function $f$ will be as follows:

$$t=de+g$$

$$f=ta+tbc.$$

If the number of literals is used as an approximation of area cost, then a savings of 4 literals (12-8) is obtained.

Single-cube divisors of interest are those with two literals only. For the previous function $f$, two single-cube divisors can be extracted: bc and de. If bc is extracted, then the multi-level network of the function $f$ will be as follows:

$$t=bc$$

$$f=ade+ag+tde+tg.$$

Area saving in this case will be zero.

Single cubes with two literals can have a positive area weight if it's included in more than two cubes. Table 8 shows the fast extraction algorithm used to get multi-level networks with optimized area. It extracts all possible double and single cube divisors and calculates the area weight for each cube. The cube with the highest area weight will be extracted. Then, the same algorithm will be applied recursively on the resulting multi-level network until no positive area weight cubes can be extracted. The area weight for a single cube divisor s can be simply calculated according to the following equation:

$$W_s=k-2,$$

where k is the number of cubes containing the single cube s. However, the area weight of a double-cube divisor d is calculated using the following formula:

$$W_d=p*l-p-l+B+c,$$

where p is the number of bases including complement bases, l is the number of literals in cube d, B is the total number of literals in all bases, and c is the number of cubes containing the complement of double-cube divisors with two literals.

TABLE 8

Fast Extraction Algorithm for Area Optimization

Repeat
   Select a double-cube divisor d that has a maximum area weight $W_{dmax}$
   Select a single-cube divisor s having a maximum area weight $W_{smax}$
   If $W_{dmax} > W_{smax}$
     Select d
   Else
     Select s TABLE 8-continued Fast Extraction Algorithm for Area Optimization $W = \max(W_{dmax}, W_{smax})$
   If W > 0 then substitute selected divisor
   Re-compute weights of affected single-cube and double-cube divisors
Until ( W <= 0)

Fast Extraction may be used for reliability. The objective here is to obtain area improvement but with a low impact on reliability. To study the effect of single-cube extraction on masking, consider the Boolean function $f1$=abc+abd+abe+ kg. The single-cube that can be extracted is ab, with area weight of 1. The multi-level network after extracting ab, will be as follows:

$$t=ab$$

$$f1=tc+td+te+kg.$$

Figure 9A:
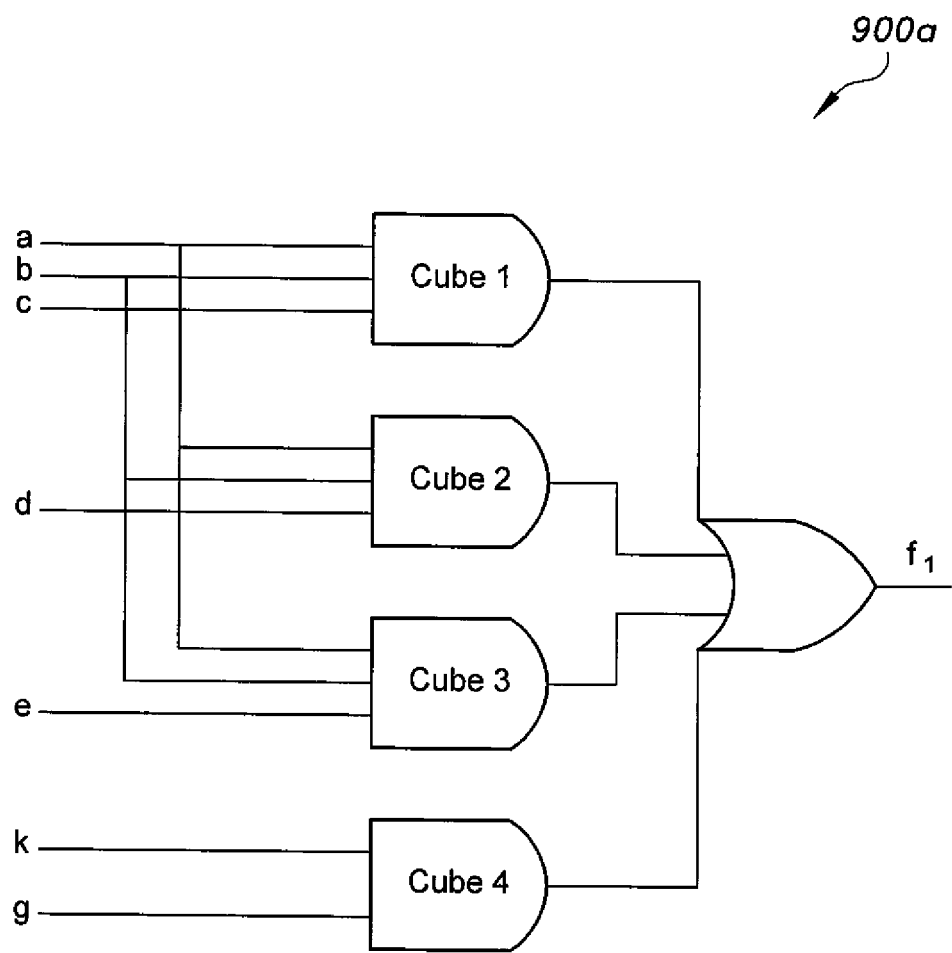
FIG. 9A is a schematic diagram of an exemplary combinatorial circuit including four cubes.
Figure 9B:
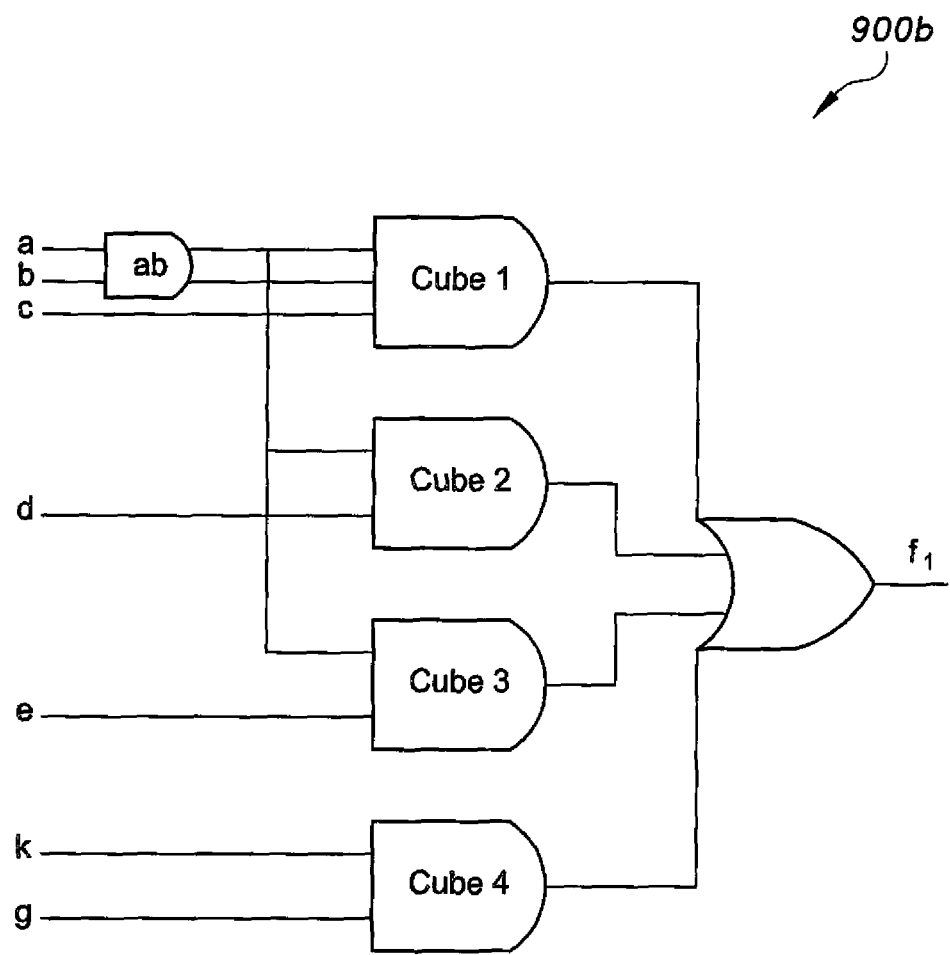
FIG. 9B is a schematic diagram of a soft error masking cover of the exemplary combinatorial circuit of FIG. 9A.

FIG. 9A shows the logic network 900a for the original function $f1$, and FIG. 9B shows the logic network 900b for $f1$ after extracting the single-cube ab. Considering the case for on-set minterms covered by more than one cube, the masking won't be affected in the cubes from which the single-cube was extracted. That is, if a fault hits in the logic of one cube, it is still masked by other cubes that cover the same input minterm. For on-minterms covered by only one cube, suppose that S is the set of cubes from which the single-cube divisor is extracted. Two cases can be analyzed: The first one, if the covering single cube is among cubes in S. The other case, if the single cube is not contained in S. In the first case, the circuit behavior against single faults won't be affected. The faults in other cubes are masked by the covering cube, and the faults in the covering cube are not tolerated. In the second case, extracting the single-cube divisor won't affect masking behavior as the covering cube is not included in S, and so, faults in the logic of other cubes will be masked by the output of the covering cube.

To analyze the effect of extracting a single-cube divisor on off-minterms, consider the off-minterm abcdekg=0011100. In FIG. 9A, if this minterm is applied, then any single fault hitting at the inputs of the AND gates is tolerated, since each cube has two zero inputs. After extracting the single-cube divisor as shown in FIG. 9B, each cube from 1 to 3 has two inputs, and only one of them is zero. In this case, single faults at zero inputs of these cubes are not tolerated. Thus, the circuit becomes worse in terms of reliability. Thus, the off-minterms in which circuit reliability maybe affected are those minterms that make both extracted literals to be zeros. In each cube from which the single-cube divisor is extracted, masking at the inputs is affected if only two inputs are zeros, and those inputs are the ones extracted in the single-cube divisor. Based on previous discussion, for a single-cube divisor s, a reliability weight can be defined as follows:

$$R_S = \sum_{m=1}^{n} \left( P_m * \frac{|C_m|}{|C|} \right),$$

where n is the number of off-minterms that make both extracted literals of single cube to be zeros. $P_m$ is the probability of off-minterm m. C is the set of cubes from which the single-cube divisor is extracted. $C_m$ is the set of cubes from C such that if minterm in is applied, the cube will have only two zero inputs, and those inputs are the ones extracted in the single-cube divisor.

Extracting double-cube divisors has a different impact on fault masking. Consider the Boolean function $f_2$=ab+ac+de, with the double-cube divisor (b+c). The multi-level network after extracting (b+c) will be as follows:

$$t = b+c$$

$$f_2 = at+de.$$

Figure 10A:
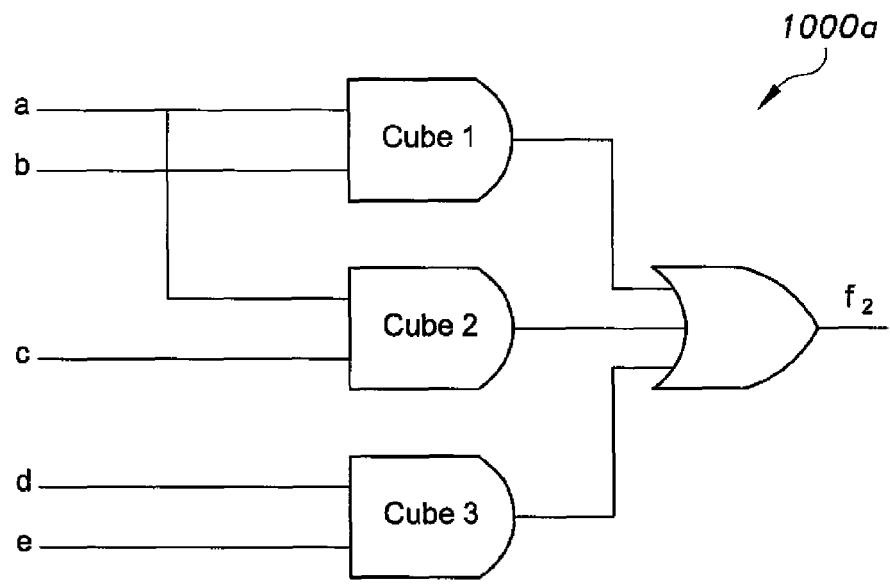
FIG. 10A is a schematic diagram of an exemplary combinatorial circuit having 3 cubes.
Figure 10B:
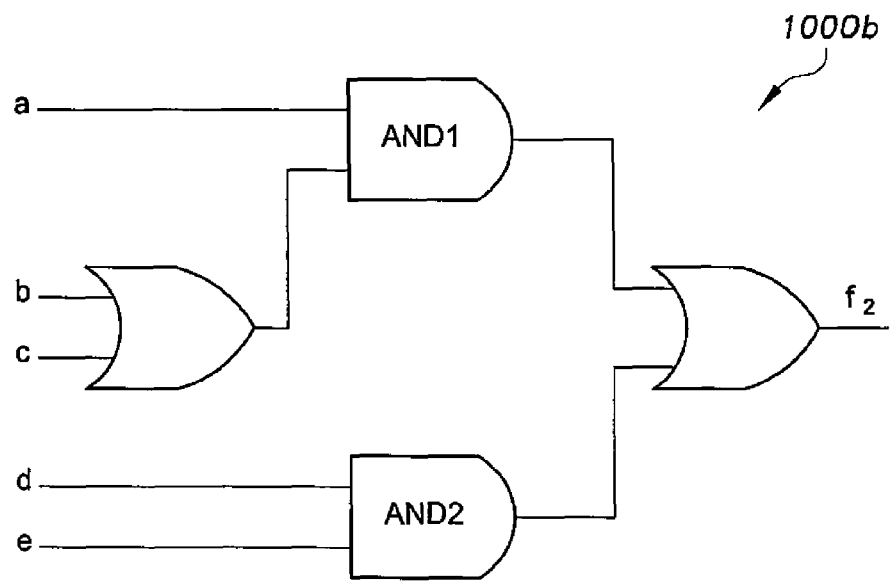
FIG. 10B is a schematic diagram of a soft error masking double cube extraction of the circuit of FIG. 10A.
Figure 11A:
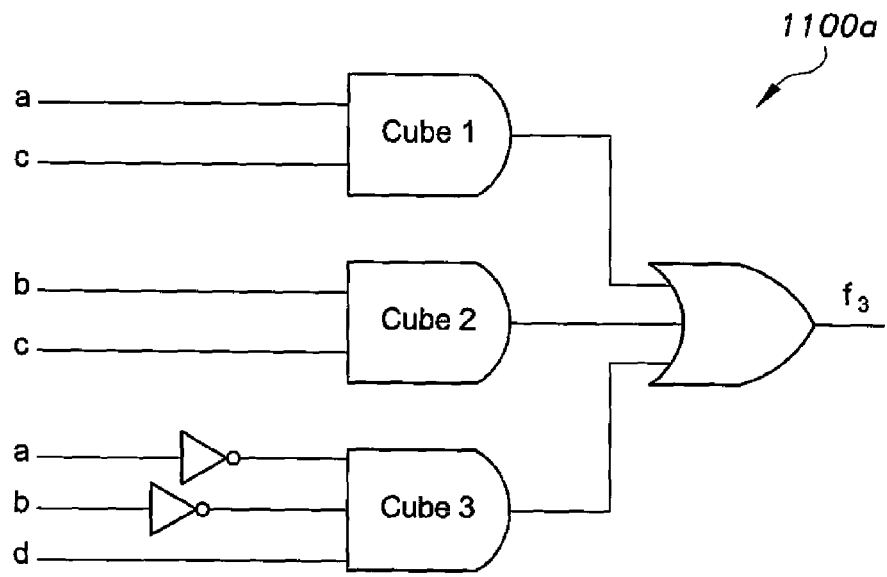
FIG. 11A is a schematic diagram of a 3-cubed exemplary combinatorial circuit.
Figure 11B:
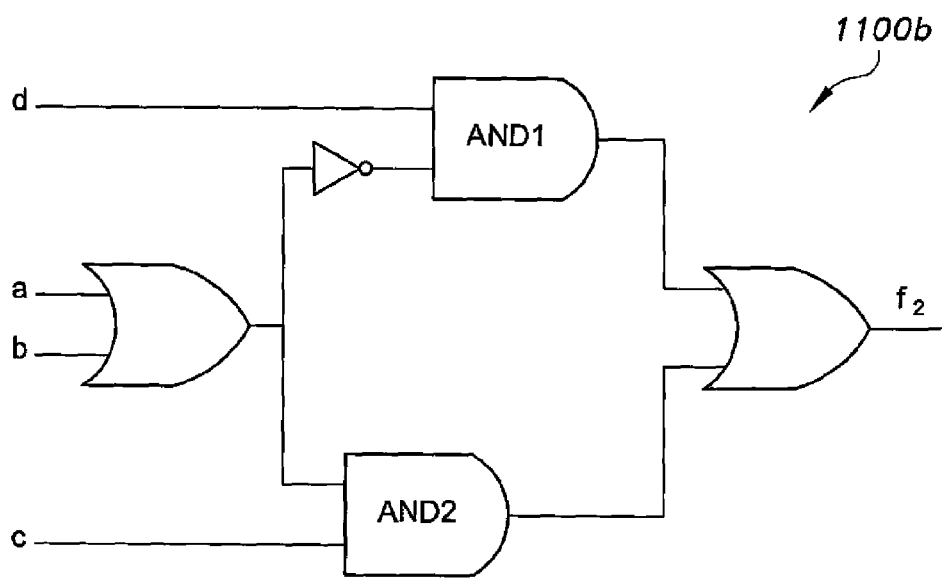
FIG. 11B is a schematic diagram of a soft error masking double cube extraction of the circuit of FIG. 11A.

FIG. 10A shows logic network 1000a, which is for the original function f2, and FIG. 10B, which shows logic network 100b, which is for $f_2$ after extracting the double cube b+c. Considering the case for on-set minterms covered by more than one cube, fault masking according to covering is different than that in the original implementation. To illustrate the difference, suppose m1 is a minterm that is covered only by cube1 and cube2. In the original implementation, if an error hits in the logic of any cube, it will be masked by the other cube except if the error hits in the shared input a. However, in the second implementation, masking of errors according to covering can only occur at the inputs of OR gate (b+c). Thus none of the errors at inputs or output of AND1 are tolerated. Note that the error on input a will not be masked in both implementations. And so, in this case, we are adding two extra faulty lines, namely, the output of AND1 and its second input. In another case, suppose m2 is a minterm that is covered by cube3 and at least one of the cubes; cube1 and cube2. In this case, fault masking isn't affected since m2 is covered also by another cube outside the extracted double cube base cubes, and so, if an error hits in any of the AND gates; AND1 and AND2 or their inputs, it will be masked by the other AND.

To analyze the effect on on-minterms covered by only one cube, suppose that S is the set of cubes from which the double-cube divisor is extracted. If the single cube isn't among cubes S, masking behavior is not affected after extracting the double-cube divisor. The faults in other cubes are masked by the covering cube, and the faults in the covering cube are not tolerated. If the single cube is contained in S, masking behavior is also not affected. The faults in the covering cube logic are not tolerated, and the faults in other cubes logic are masked by the covering cube. Regarding off-minterms, masking properties for extracted cubes if they have multiple zero inputs are still preserved.

To test the previous analysis, both implementations were simulated using minterms with probabilities as specified in Table 9. In this table, four on-minterms are provided with their probabilities. We assume that the probability of other on-minterms is 0.1, and the probability of off-minterms is 0.1. This table shows that the probability of minterm 11100 has the main effect on failure rate of the multi-level implementation. As the probability of this minterm increases, the failure rate of the multi-level implementation becomes worse. This can be generalized as follows. The failure rate of a multi-level circuit resulting from extracting a double-cube depends on the probability of minterms that are covered only by cubes from which the double-cube is extracted.

TABLE 9

Failure Rate for Two implementations of $f_2$ = ab + ac + de for Different Minterms Probabilities

| Minterms | Covered By | Minterms' Probabilities | | | | | | |
|---|---|---|---|---|---|---|---|---|
| 11000 | cube 1 only | 0.77 | 0.01 | 0.01 | 0.25 | 0.15 | 0.05 | 0.01 |
| 11100 | cube 1, cube 2 | 0.01 | 0.01 | 0.01 | 0.05 | 0.35 | 0.65 | 0.77 |
| 11011 | cube 1, cube 3 | 0.01 | 0.77 | 0.01 | 0.25 | 0.15 | 0.05 | 0.01 |

TABLE 9-continued

Failure Rate for Two implementations of $f_2$ = ab + ac + de for Different Minterms Probabilities

| Minterms | Covered By | Minterms' Probabilities | | | | | | |
|---|---|---|---|---|---|---|---|---|
| 00011 | cube 3 only | 0.01 | 0.01 | 0.77 | 0.25 | 0.15 | 0.05 | 0.01 |
| Failure Rate | Original | 0.23 | 0.05 | 0.18 | 0.14 | 0.13 | 0.11 | 0.09 |
| | After executing double cube | 0.25 | 0.06 | 0.22 | 0.18 | 0.22 | 0.2 | 0.22 |

To analyze the case that involves extracting a double-cube along with its complement, three cases can be considered: D112, D222, D223. An example for the D112 case is a double-cube (a+b) with its complement a'b'. An example of the D222 case is a double-cube (ab+a'b') with its complement (ab'+a'b). An example of the D223 case is a double-cube (ab+a'c) with its complement (ab'+a'c'). For the cases D222 and D223, it's impossible for a minterm to be covered by the two cubes from which a double-cube divisor is extracted neither its complement cubes. Hence, fault masking will not be affected if the double-cube divisor is extracted in these two cases. For the D112 case, consider the Boolean function $f3$=ac+bc+abd. The double-cube divisor that can be extracted is (a+b). The multi-level network after extracting (a+b) along with its complement (a'b') will be as follows: t=a+b, $f3$=t c+t' d. FIGS. 11A, 1100a and 11B, 1100b show the logic network for $f3$ before and after extracting the double-cube respectively. As discussed before, if a minterm is covered by both cubes ac and bc (cube 1 and cube2), fault masking for this minterm will be highly affected by extraction.

For minterms covered by only one cube, two cases can be considered, namely, the case for a minterm covered by one of the cubes cube1 or cube2, and the case of a minterm covered by cube3. In both cases, masking behavior is not changed since only AND gate will produce logic 1. However, the number of faulty wires may slightly increase in the multi-level network depending on the value of the minterm. Nevertheless, minterms covered by both cubes (cube1 and cube2) are the main minterms for which masking behavior is changed. Regarding off-minterms, the same analysis discussed before can be applied here.

As the objective is to improve area cost with low impact on reliability, double-cube divisors should be extracted such that this objective is satisfied. Each double-cube divisor can have a reliability weight in addition to the area weight. For a double-cube d with bases b1, ..., bn, the reliability weight can be calculated as follows:

$$R_d = \sum_{i=1}^{n} R_{b_i}.$$

$R_{b_i}$ is the probability of minterms covered only by cubes from which base bi is extracted. According to this weight, a double-cube divisor will not be extracted if its reliability weight is larger than a certain threshold. To justify the proposed weight, consider the following Boolean function: x=abf+adef+cde. Two double cubes can be extracted: (b+de) and (af+c). If (b+de) is extracted, then the multi-level circuit will be as follows: t=b+de, $x_1$=taf+cde. If (af+c) is selected, then the multi-level circuit will be as follows: t=af+c, $x_2$=abf+tde. Table 10 shows the failure rate for the x, $x_1$, and $x_2$ implementations for different minterms' probabilities. In this table, two on-minterms are provided with their probabilities. We assume that the probability of other on-minterms is 0.1, and the probability of off-minterms is 0.1. According to suggested reliability weight, the weight of (b+de) double cube is the probability of the minterm 110111, and the weight of (af+c) is the probability of 101111. The table shows that extraction of the double-cube with lower weight gives better circuit. And so, the proposed reliability weight chooses the cube with better reliability. The weight function reflects the negative impact on reliability resulting from extracting the double-cube divisor.

TABLE 10

Failure Rate for Two Implementations of x = abf + adef + cde for Different Minterms Probabilities

| Minterms | Covered By | Minterms' Probabilities | | | | |
|---|---|---|---|---|---|---|
| 110111 | abf and adef | 0.1 | 0.3 | 0.4 | 0.5 | 0.7 |
| 101111 | adef and cde | 0.7 | 0.5 | 0.4 | 0.3 | 0.1 |
| Failure | x | 0.84 | 0.094 | 0.08 | 0.09 | 0.083 |
| Rate | x1 | 0.11 | 0.122 | 0.145 | 0.17 | 0.178 |
|  | x2 | 0.18 | 0.168 | 0.142 | 0.124 | 0.1 |

Given a reliability optimized two-level circuit, Algorithm 2—shown in Table 11 can be used to find a multi-level implementation with less area overhead and with low impact on reliability. Algorithm 2 is a modified version of the original fast extraction algorithm. Instead of extracting the single-cubes and double-cubes according to area weight only, the reliability weight is taken into consideration.

Algorithm 2 finds the set of all possible double-cube divisors; the area and reliability weights are calculated for each of them. A set of double-cube divisors D with reliability weight less than a threshold is constructed. Among double-cube divisors in D, the best double cube d to be extracted is the one with highest area weight. For all possible single-cube divisors, the set of single-cube divisors S with reliability weight less than a threshold is constructed. Among single-cube divisors in S, the best single-cube s to be extracted is the one with highest area weight. The cube among s and d with larger area saving is selected to be extracted. The same process is repeated until no area improvement can be achieved.

TABLE 11

Algorithm 2 inputs: two-level circuit, Threshold
Repeat
  Find all double-cube divisors D with Reliability Weight < Threshold
  Select a double-cube divisor d from D that has a maximum Area weight $W_{dmax}$
  Find all single-cube divisors S with Reliability Weight < Threshold
  Select a single-cube divisor s from S having a maximum Area weight $W_{smax}$
  If $W_{dmax} > W_{smax}$
    Select d
  Else
    Select s
  W = max ($W_{dmax}$, $W_{smax}$)
  If W > 0 then substitute selected divisor
  Re-compute weights of affected single and double-cube divisors
Until (W<= 0)

Figure 12:
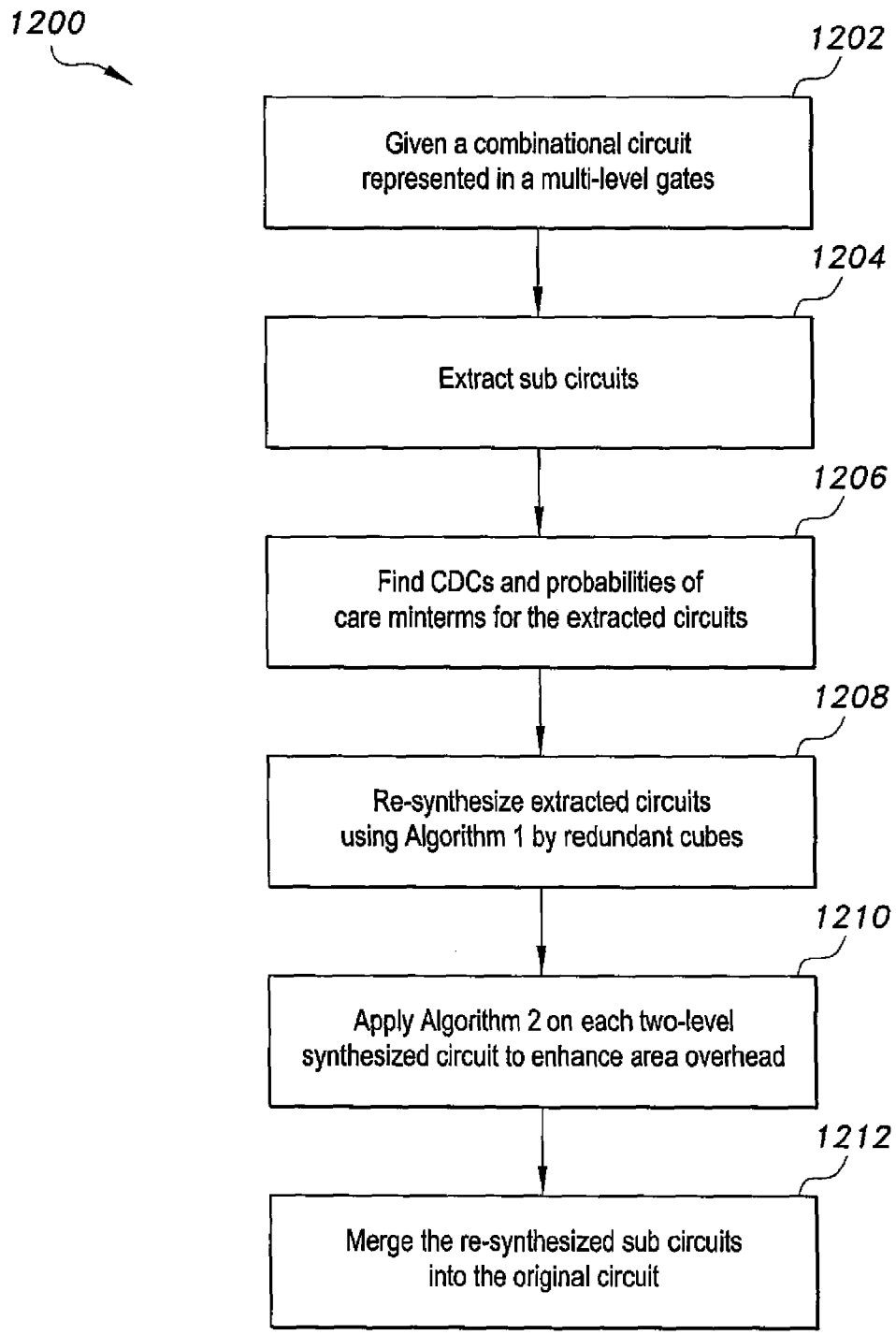
FIG. 12 is a flowchart showing the soft error masking procedure.

Algorithm 1 is used to enhance fault masking for an extracted sub-circuit. It results in a two-level circuit in which masking against single fault is maximized. Algorithm 2 improves area overhead of reliability optimized two-level circuits. It has low impact on reliability enhancement achieved using Algorithm 1. Framework 1200 should be applied in the design procedure, as shown in FIG. 12. As shown in 1202, the framework utilizes a given combinational circuit represented in a multi-level gates. Sub-circuits are extracted at step 1204. CDCs and probabilities of care minterms for the extracted circuits are found at step 1206. At step 1208 extracted circuits are re-synthesized using Algorithm 1 by redundant cubes. At step 1210 algorithm 2 is applied on each two-level synthesized circuit to enhance area overhead. At step 1212 the re-synthesized circuits are merged into the original circuit.

The fast extraction algorithm is explored to enhance area for reliability optimized two-level circuits. It's found that this algorithm, with some modifications, can be used effectively to achieve this objective. In addition to area weight, reliability weight is also used in selecting single-cube and double-cube divisors. This technique is proposed as Algorithm 2. Algorithm 2 ensures that the selected single-cube and double-cube divisors will have a low negative impact on reliability.

A reliability evaluator based on Monte-Carlo simulation was implemented To demonstrate the effectiveness of Algorithms 1 and 2. A stuck-at fault model and a fault injection mechanism were chosen.

Comparing the reliability of original combinational benchmark circuits with their re-synthesized versions is done by measuring the failure rate per injected faults. Knowing that reliability is inversely proportional to failure rate, varying the number of faults injected to the combinational benchmark circuits and measuring the failure rate for each injected fault is an effective way to measure their fault tolerance (or reliability). Logically, circuit reliability starts from 100% when no faults occur, and decreases as the number of faults increases. In other words, the failure rate grows as the number of faults increases.

To evaluate circuit failure rate probability, a simulation-based reliability model is often adopted. However, since a record of the failure rate against the number of injected faults is desired the typical reliability model was modified accordingly.

The goal of the reliability evaluator is to measure the failure rate of combinational circuits as the number of injected faults grows. It is done by using Monte-Carlo simulation methods. For each circuit, the failure rate is found by injecting faults for a certain number of iterations and counting the number of success and failed iterations. The framework of getting the failure rate of a circuit is stated in the following points. For every number of faults F from 1 to N, where N is the maximum number of faults to be injected Set the number of failed iterations, k, to zero. For each iteration i from 1 to T, where T is the maximum number of iterations, generate a random input vector, where the length of the vector is the same as the number of inputs in the circuit. Simulate the circuit to get fault free original output by applying the generated random vector and store the output response in O, where the length of O is the same as the number of outputs in the circuit. Inject F number of faults in the circuit randomly. Simulate the circuit to get the faulty output response and store it in OF, where the length of OF is the same as the number of outputs in the circuit. If the output response O is different from OF, then k is incremented. Otherwise, it is successful. The process is Repeated for the next i. Then the failure rate when F faults are injected is Calculated, denoted by $R_F$, where $R_F=k/T$. The process is repeated for all F.

Assumptions include the fact that the number of injected faults should be small. In reality, they are measured by FIT (failure in each $10^9$ hours of operation. The number of iterations, T, is 10000. The faults are injected randomly at the gate level of a circuit. Only logical masking is considered by the circuit evaluator. Neither electrical masking nor timing masking is considered.

The evaluator utilizes a stuck at fault model. When faults are injected at any line, they can be either stuck-at-1 (i.e. connected to Vdd) or stuck-at-0 (i.e. connected to ground). Fault injection happens at the gate level of the circuit randomly, a list of all lines in a circuit is constructed and at each time a random line is selected. A line can be a gate input, gate output, or a fan-out line. In case of a stuck-at-1 fault, the line at which the fault is injected is replaced by an OR-gate with a fault indicator input $F_i$ set to 1. When a stuck-at-0 fault is injected, the line at which the fault is injected is replaced by an AND-gate with a fault indicator input $F_i$ set to 0.

When a known logic minimizer (ESPRESSO) was used against an original test circuit and then used against the re-synthesized versions formulated using Algorithm 1 and Algorithm 2, significant improvement in fault tolerance was noted under the re-synthesized versions. Moreover, the circuits synthesized using Algorithm 1 and Algorithm 2 can be made triply redundant with 2 out of 3 voting in a triple modular redundant (TMR) format to further mitigate soft error rates.

It is to be understood that the present invention is not limited to the embodiments described above, but encompasses any and all embodiments within the scope of the following claims.

We claim:

1. A computer-implemented method for synthesizing soft error tolerant combinational circuits, comprising the steps of:
   inputting an original gate level combinational circuit;
   specifying a maximum number of inputs M to the original gate level circuit;
   extracting smaller sub-circuits from the original gate level circuit based on the maximum number of inputs M and subject to constraints of limiting the number of inputs M for a feasible running time, limiting the number of outputs per each extracted circuit to 1, restricting for each extracted sub-circuit the number of fan-outs to other circuits to zero;
   returning a list of the extracted sub-circuits subject to the constraints;
   determining a number of controllability don't care (CDC) conditions for each sub-circuit in the list, thereby discovering a set of care minterms for each extracted sub-circuit;
   computing, via simulation, the probability of each care minterm to occur for each extracted sub-circuit;
   producing a new multi-level sub-circuit from each of the extracted sub-circuits;
   maximizing logical fault masking against the occurrence of a single fault applied to each of the new multi-level sub-circuits, wherein the maximizing is based on the computed probabilities; and
   merging the new multi-level sub-circuits back to the original inputted gate level combinational circuit.

2. The computer-implemented method for synthesizing soft error tolerant combinational circuits according to claim 1, further comprising the steps of:
   extracting a window circuit from said original circuit for each said sub-circuit;
   constructing said window circuit by adding levels until said window circuit has a feasible number of inputs; and
   applying all possible input combinations on said inputs of said window circuit, thereby assisting in said determining of said number of controllability don't care (CDC) conditions.

3. The computer-implemented method for synthesizing soft error tolerant combinational circuits according to claim 1, further comprising the steps of:
   computing a failure rate estimate of said multi-level sub-circuits according to the relation:

$$\text{Estimated Failure Rate} = \frac{\sum_{m \in On}(p_m * f_m) + \sum_{m \in Off}(p_m * f_m)}{\text{Total Wires} * 2},$$

where $p_m$ is the probability of a minterm m and $f_m$ is the number of faulty wires for minterm m.

4. The computer-implemented method for synthesizing soft error tolerant combinational circuits according to claim 3, further comprising the steps of:
   inputting ON-set and OFF-set minterms, including their probabilities, don't cares, and threshold values;
   initializing a cover S={ };
   selecting said minterms SM based on a comparison of the summation of probabilities of all On-set minterms ($P_{ON}$) versus summation of probabilities of all Off-set minterms ($P_{OFF}$), said On-set minterms being selected if $P_{ON} > P_{OFF}$, said Off-set minterms being selected if $P_{ON} \leq P_{OFF}$;
   finding all prime implicants (cubes) P of said selected minterms;
   finding all existing essential cubes and adding them to the cover S;
   until all minterms in SM are covered by S, calculating a weight for each non-selected prime implicant in P using SM minterms according to the relation:

$$W_C = \sum_{M \in SM-minterms}(W_M * M_p),$$

where $W_C$ is the cube weight, $$W_M = \begin{cases} 0.00001 & \text{if } M \text{ is covered by } C \text{ and is not covered by } S \\ \dfrac{F_{old} - F_{new}}{F_{old}} & \text{if } M \text{ is covered by } S \end{cases},$$

where M is each individual said minterms, $W_M$ is said individual minterm's weight, C is a new cube added to said cover S, $F_{old}$ represents the number of faulty wires in the cover S for M, and $F_{new}$ represents the number of faulty wires in cover S with the new cube C added to the cover S;
   selecting the highest weight cube C that covers new minterms in SM that are not covered by S;
   adding said cube C to said cover S;
   removing redundant cubes from said cover S;
   performing said weight calculation for each not selected prime implicant in P;
   adding said R cube to the cover S until $F_S - F_{S1} \leq \text{Thr}$,
where R=the prime cube with highest weight, $F_S$=estimated failure rate of the cover S, Thr is said threshold, and $F_{S1}$=estimated failure rate of the cover S+R;
   where a single cube is produced by said cover S, synthesizing a circuit new in the following manner:
      said single cube produced by said cover S is duplicated;
      where $P_{ON} > P_{OFF}$ a cube (AND) gate is duplicated using an OR gate;

where $P_{ON} \le P_{OFF}$ a cube (NAND) gate is duplicated using an AND gate;
where multiple cubes are produced by said cover S, synthesizing said circuit new in the following manner:
where $P_{ON} > P_{OFF}$ implementing said S cubes as AND gates feeding an OR gate;
where $P_{ON} \le P_{OFF}$ implementing said S cubes as AND gates feeding a NOR gate.

5. The computer-implemented method for synthesizing soft error tolerant combinational circuits according to claim 4, further comprising the steps of:
  i) finding all double-cube divisors D with Reliability Weight<Threshold Thr;
  ii) selecting a double-cube divisor d from D that has a maximum Area weight $W_{dmax}$;
  iii) finding all single cube divisors from said cover S having a reliability weight less than said Threshold Thr;
  iv) selecting a single-cube divisor s from S having a maximum Area weight $W_{smax}$;
  v) selecting said double-cube divisor d for all circuits where $W_{dmax} > W_{smax}$;
  vi) selecting said single-cube divisor s where $W_{dmax} \le W_{smax}$;
  vii) substituting said selected divisor in all instances where a computation of the maximum of ($W_{dmax}$, $W_{smax}$)>0;
  viii) re-computing weights of affected said single and said double cube divisors; and
  ix) repeating steps i) to viii) until said max ($W_{dmax}$, $W_{smax}$) $\le 0$, wherein said combinational circuit is area optimized.

6. The computer-implemented method for synthesizing soft error tolerant combinational circuits according to claim 5, further comprising the steps of:
computing said single cube divisor reliability weight according to the relation:

$$R_S = \sum_{m=1}^{n} \left( P_m * \frac{|C_m|}{|C|} \right),$$

where n is the number of off-minterms that make both extracted literals of said single cube to be zeros. $P_m$ is the probability of off-minterm m. C is the set of cubes from which the single-cube divisor is extracted. $C_m$ is the set of cubes from C such that if minterm m is applied, the cube will have only two zero inputs, and those inputs are the ones extracted in the single-cube divisor; and
computing said double cube divisor reliability weight according to the relation, $$R_d = \sum_{i=1}^{n} R_{b_i}.$$

where for a double-cube d with bases b1, ..., bn, $R_{b_i}$ is the probability of minterms covered only by cubes from which base $b_i$ is extracted.

7. A computer software product, comprising a non-transitory medium readable by a processor, the non-transitory medium having stored thereon a set of instructions for synthesizing soft error tolerant combinational circuits, the set of instructions including:
  (a) a first sequence of instructions which, when executed by the processor, causes said processor to input an original gate level combinational circuit;
  (b) a second sequence of instructions which, when executed by the processor, causes said processor to specify a maximum number of inputs M to said original gate level circuit;
  (c) a third sequence of instructions which, when executed by the processor, causes said processor to extract smaller sub-circuits from said original gate level circuit based on said maximum number of inputs M and subject to constraints of limiting the number of inputs M for a feasible running time, limiting the number of outputs per each extracted circuit to 1, restricting for each extracted sub-circuit the number of fan-outs to other circuits to zero;
  (d) a fourth sequence of instructions which, when executed by the processor, causes said processor to return a list of said extracted sub-circuits subject to said constraints;
  (e) a fifth sequence of instructions which, when executed by the processor, causes said processor to determine a number of controllability don't care (CDC) conditions for each sub-circuit in said list, thereby discovering a set of care minterms for each extracted sub-circuit;
  (f) a sixth sequence of instructions which, when executed by the processor, causes said processor to compute, via simulation, the probability of each care minterm to occur for each extracted sub-circuit;
  (g) a seventh sequence of instructions which, when executed by the processor, causes said processor to produce a new multi-level sub-circuit from each said extracted sub-circuit;
  (h) an eighth sequence of instructions which, when executed by the processor, causes said processor to maximize logical fault masking against the occurrence of a single fault applied to each said new multi-level sub-circuit, wherein said maximizing is based on said computed probabilities;
  (i) a ninth sequence of instructions which, when executed by the processor, causes said processor to merge said new multi-level sub-circuits back to said original inputted gate level combinational circuit.

8. The computer software product according to claim 7, further comprising:
  a tenth sequence of instructions which, when executed by the processor, causes said processor to extract a window circuit from said original circuit for each said sub-circuit;
  an eleventh sequence of instructions which, when executed by the processor, causes said processor to construct said window circuit by adding levels until said window circuit has a feasible number of inputs; and
  a twelfth sequence of instructions which, when executed by the processor, causes said processor to apply all possible input combinations on said inputs of said window circuit, thereby assisting in said determination of said number of controllability don't care (CDC) conditions.

9. The computer software product according to claim 8, further comprising:
  a thirteenth sequence of instructions which, when executed by the processor, causes said processor to compute a failure rate estimate of said multi-level sub-circuits according to the relation:

$$\text{Estimated Failure Rate} = \frac{\sum_{m \in On}(p_m * f_m) + \sum_{m \in Off}(p_m * f_m)}{\text{Total Wires} * 2}$$

where $p_m$ is the probability of a minterm m and $f_m$ is the number of faulty wires for minterm in.

10. The computer software product according to claim 9, further comprising:
   a fourteenth sequence of instructions which, when executed by the processor, causes said processor to input ON-set and OFF-set minterms including their probabilities, don't cares, and threshold values;
   a fifteenth sequence of instructions which, when executed by the processor, causes said processor to initialize a cover S={ };
   a sixteenth sequence of instructions which, when executed by the processor, causes said processor to select said minterms SM based on a comparison of the summation of probabilities of all On-set minterms ($P_{ON}$) versus summation of probabilities of all Off-set minterms ($P_{OFF}$), said On-set minterms being selected if $P_{ON}>P_{OPT}$ said Off-set minterms being selected if $P_{ON} \leq P_{OFF}$;
   a seventeenth sequence of instructions which, when executed by the processor, causes said processor to find all prime implicants (cubes) P of said selected minterms;
   an eighteenth sequence of instructions which, when executed by the processor, causes said processor to (until all minterms in SM are covered by S) calculate a weight for each not selected prime implicant in P using SM minterms according to the relation, $$W_C = \sum_{M \in SM-minterms} (W_M * M_p),$$

where $W_C$ is the cube weight, $$W_M = \begin{cases} 0.00001 & \text{if } M \text{ is covered by } C \text{ and is not covered by } S \\ \dfrac{F_{old} - F_{new}}{F_{old}} & \text{if } M \text{ is covered by } S \end{cases},$$

where M is each individual said minterms, $W_M$ is said individual minterm's weight, C is a new cube added to said cover S, $F_{old}$ represents the number of faulty wires in the cover S for M, and $F_{new}$ represents the number of faulty wires in cover S with the new cube C added to the cover S;
   a nineteenth sequence of instructions which, when executed by the processor, causes said processor to select the highest weight cube C that covers new minterms in SM that are not covered by S;
   a twentieth sequence of instructions which, when executed by the processor, causes said processor to add said cube C to said cover S;
   a twenty-first sequence of instructions which, when executed by the processor, causes said processor to remove redundant cubes from said cover S;
   a twenty-second sequence of instructions which, when executed by the processor, causes said processor to perform said weight calculation for each not selected prime implicant in P;
   a twenty-third sequence of instructions which, when executed by the processor, causes said processor to add said R cube to the cover S until $F_S - F_{S1} \leq Thr$, where R=the prime cube with highest weight, $F_S$=estimated failure rate of the cover S, Thr is said threshold, and $F_{S1}$=estimated failure rate of the cover S+R;
   a twenty-fourth sequence of instructions which, when executed by the processor, causes said processor to (where a single cube is produced by said cover S, synthesize a circuit new in the following manner:
      said single cube produced by said cover S is duplicated;
      where $P_{ON}>P_{OFF}$ a cube (AND) gate is duplicated using an OR gate;
      where $P_{ON} \leq P_{OFF}$ a cube (NAND) gate is duplicated using an AND gate;
   a twenty-fifth sequence of instructions which, when executed by the processor, causes said processor to (where multiple cubes are produced by said cover S, synthesize said circuit new in the following manner:
      where $P_{ON}>P_{OFF}$ implementing said S cubes as AND gates feeding an OR gate;
      where $P_{ON} \leq P_{OFF}$ implementing said S cubes as AND gates feeding a NOR gate.

11. The computer software product according to claim 10, further comprising a twenty-sixth sequence of instructions which, when executed by the processor, causes said processor to:
   i) find all double-cube divisors D with Reliability Weight<Threshold Thr;
   ii) select a double-cube divisor d from D that has a maximum Area weight $W_{dmax}$;
   iii) find all single cube divisors from said cover S having a reliability weight less than said Threshold Thr;
   iv) select a single-cube divisor s from S having a maximum Area weight $W_{smax}$;
   v) select said double-cube divisor d for all circuits where $W_{dmax}>W_{smax}$;
   vi) select said single-cube divisor s where $W_{dMaX} \leq W_{sMaX}$;
   vii) substitute said selected divisor in all instances where a computation of the maximum of $(W_{dmax}, W_{smax})>0$;
   viii) re-compute weights of affected said single and said double cube divisors; and
   ix) repeat steps i) to viii) until said max $(W_{dmax}, W_{smax}) \leq 0$, wherein said combinational circuit is area optimized.

12. The computer software product according to claim 11, further comprising:
   a twenty-seventh sequence of instructions which, when executed by the processor, causes said processor to compute said single cube divisor reliability weight according to the relation:

$$R_S = \sum_{m=1}^{n} \left( P_m * \frac{|C_m|}{|C|} \right),$$

where n is the number of off-minterms that make both extracted literals of said single cube to be zeros, $P_m$ is the probability of off-minterm m, C is the set of cubes from which the single-cube divisor is extracted, $C_m$ is the set of cubes from C such that if minterm m is applied, the cube will have only two zero inputs, and those inputs are the ones extracted in the single-cube divisor; and
   a twenty-eighth sequence of instructions which, when executed by the processor, causes said processor to compute said double cube divisor reliability weight according to the relation:

$$R_d = \sum_{i=1}^{n} R_{b_i},$$

where for a double-cube d with bases b1, ..., bn, $R_{b_i}$ is the probability of minterms covered only by cubes from which base $b_i$ is extracted.

* * * * *